US011176006B2

(12) United States Patent
Stewart

(10) Patent No.: US 11,176,006 B2
(45) Date of Patent: Nov. 16, 2021

(54) RECONFIGURING AN ADDRESSING MECHANISM FOR A SYSTEM ON CHIP TO BYPASS A DEFECTIVE BRANCH UNIT

(71) Applicant: UltraSoC Technologies Limited, Cambridge (GB)

(72) Inventor: Callum Stewart, Livingston (GB)

(73) Assignee: SIEMENS INDUSTRY SOFTWARE INC., Plano, TX (US)

(*) Notice: Subject to any disclaimer, the term of this patent is extended or adjusted under 35 U.S.C. 154(b) by 0 days.

(21) Appl. No.: 16/994,373

(22) Filed: Aug. 14, 2020

(65) Prior Publication Data
US 2021/0049081 A1 Feb. 18, 2021

(30) Foreign Application Priority Data
Aug. 16, 2019 (GB) ...................................... 1911784

(51) Int. Cl.
*G06F 11/20* (2006.01)
*G06F 13/40* (2006.01)
*G06F 11/14* (2006.01)

(52) U.S. Cl.
CPC ...... *G06F 11/2007* (2013.01); *G06F 11/1423* (2013.01); *G06F 13/4027* (2013.01); *G06F 2201/85* (2013.01)

(58) Field of Classification Search
CPC .............. G06F 11/142; G06F 11/1423; G06F 11/2002; G06F 11/2005; G06F 11/2023;
(Continued)

(56) References Cited

U.S. PATENT DOCUMENTS 9,710,265 B1 7/2017 Temam et al.
2007/0110024 A1* 5/2007 Meier .................... H04W 40/28
370/351
(Continued)

FOREIGN PATENT DOCUMENTS

WO 2019/040587 A1 2/2019

OTHER PUBLICATIONS

European Search Report for European Application No. 20188987.0-1224 dated Jan. 22, 2021.
(Continued)

*Primary Examiner* — Bryce P Bonzo
*Assistant Examiner* — Albert Li
(74) *Attorney, Agent, or Firm* — Lempia Summerfield Katz LLC

(57) ABSTRACT

A method of reconfiguring an addressing mechanism in a system-on-chip comprising system circuitry and monitoring circuitry having tree-structured units for routing communications through the system, includes sending a discovery message, receiving discovery responses from the units, each discovery response identifying the number of individually addressable entities in that unit and those units in the branch above that unit; in response to not receiving a response from one or more units, determining that one of those units is defective; enabling a crosslink between a first unit in the same branch as the defective unit and a second unit in an adjacent branch; sending a further discovery message; receiving a further discovery response from the second unit identifying the number of individually addressable entities in that second unit, those units in the branch above that second unit, the first unit, and those units in the branch above (Continued)

the first unit; and reconfiguring the address of the crosslink so as to cause a subsequent communication to an individually addressable entity in the defective unit's branch to be routed via the adjacent branch and the crosslink, thereby bypassing the defective unit.

16 Claims, 11 Drawing Sheets

(58) Field of Classification Search
CPC ............ G06F 11/2033; G06F 13/4004; G06F 13/4022; G06F 13/4027; G06F 13/404; G06F 15/7825; H04L 41/0654; H04L 41/0659; H04L 41/0668; H04L 41/0672; H04L 45/22; H04L 45/28; H04L 47/746; H04L 49/109; H04L 49/557; H04B 10/038

See application file for complete search history.

(56) References Cited

U.S. PATENT DOCUMENTS

| | | | |
|---|---|---|---|
| 2009/0289661 A1* | 11/2009 | Lee | H03K 19/17736 326/41 |
| 2010/0188972 A1* | 7/2010 | Knapp | H04L 12/437 370/226 |
| 2012/0155482 A1* | 6/2012 | Chang | H04L 49/557 370/401 |
| 2014/0013161 A1 | 1/2014 | Hopkins | |
| 2014/0095923 A1* | 4/2014 | Alvarez-Icaza Rivera | G06F 11/2005 714/4.2 |
| 2014/0280711 A1* | 9/2014 | Asati | H04L 67/10 709/217 |

OTHER PUBLICATIONS

Negrini, Roberto, Mariagiovanna Sami, and Renato Stefanelli. "Fault tolerance techniques for array structures used in supercomputing." Computer;(United States) 19.2 (1986). pp. 78-87.
Negrini et al., "Fault Tolerant Techniques for Array Structures Used in Supercomputing," Computer, vol. 19, pp. 78-37, Feb. 1986.

* cited by examiner

RECONFIGURING AN ADDRESSING MECHANISM FOR A SYSTEM ON CHIP TO BYPASS A DEFECTIVE BRANCH UNIT

BACKGROUND

This disclosure relates to a communications protocol on an integrated circuit chip device, and in particular to a mechanism for routing messages through circuitry of an integrated circuit chip device.

In System-on-Chip (SoC) devices, multiple core devices of an embedded system are integrated onto a single chip. Traffic in the embedded system is typically conveyed over buses between the core devices. It is known to incorporate monitoring functionality onto the SoC for observing the traffic. For example, a monitoring unit may be associated with each core device for monitoring the traffic to and from that core device. The monitoring units generate data, such as collected trace data. Typically, the monitoring units operate under the control of an off-chip analyser, and send their data to that off-chip analyser for detection of any improper operation of the core devices.

It is desirable to minimise the on-chip area of the SoC dedicated to the monitoring circuitry. One efficient configuration for the monitoring network is a tree-based topology. In such a topology, a root unit connects the monitoring network to an output port of the chip. Branches extend from that root unit through the SoC, each branch having a number of units connected in series. Each unit is able to route messages through its branch to and from the root unit. Such a network is efficient for transporting messages of the monitoring circuitry around the SoC. However, in a tree-based topology, if one unit fails, then those units connected higher in the branch of the failed unit are no longer able to communicate with the root unit. In this situation, the entire SoC may be discarded as a result of a failure in a single unit of the monitoring circuitry.

In a network of nodes having a tree-based topology, it is known to protect against failure of a single node by duplicating the tree, in other words by utilising a second network of nodes having the same tree-based topology as the first network of nodes. If a node in the first network fails, then the corresponding node in the second network can be utilised to replace the failed node. Although effective, this redundant tree approach requires duplicating the area on chip dedicated to the network.

Thus, there is a need for a SoC which is more robust to failures in the monitoring network, whilst minimising the on-chip area of the SoC dedicated to the monitoring network.

SUMMARY OF THE INVENTION

According to a first aspect of this disclosure, there is provided a method of reconfiguring an addressing mechanism in a system-on-chip comprising system circuitry and monitoring circuitry for monitoring the system circuitry, the monitoring circuitry comprising units connected in a tree-based structure for routing communications through the system-on-chip, the tree-based structure comprising branches extending from a root unit, each branch comprising a plurality of units, each unit connected to a single unit above in the branch and a single unit below in the branch, whereby each unit routes communications to and from individually addressable entities above that unit in its branch, the tree-based structure further comprising crosslinks connecting corresponding units of adjacent branches, the method comprising: sending a discovery message; receiving discovery responses from the units, each discovery response identifying the number of individually addressable entities in that unit and those units in the branch above that unit; in response to not receiving a response from one or more units, determining that one of those units is defective; enabling a crosslink between a first unit in the same branch as the defective unit and a second unit in an adjacent branch; sending a further discovery message; receiving a further discovery response from the second unit identifying the number of individually addressable entities in that second unit, those units in the branch above that second unit, the first unit, and those units in the branch above the first unit; and reconfiguring the address of the crosslink so as to cause a subsequent communication to an individually addressable entity in the defective unit's branch to be routed via the adjacent branch and the crosslink, thereby bypassing the defective unit.

The method may further comprise reconfiguring the addresses of each of the intermediate units of the adjacent branch between the second unit and the root unit so as to cause the subsequent communication to be routed via the second unit.

The method may further comprise reconfiguring the root unit so as to prevent communications being sent directly to the same branch as the defective unit for those communications which are for an individually addressable entity of a destination unit, where the defective intermediate unit is between the root unit and the destination unit.

The method may further comprise reconfiguring the root unit to send communications to individually addressable entities in the defective unit's branch via the adjacent branch, for those communications which are for an individually addressable entity of a destination unit, where the defective intermediate unit is between the root unit and the destination unit.

Each unit may operate according to an addressing protocol in which each unit has the same internal address as the other units in the tree-based structure which is the base address, and in which each unit is configured to address other units using addresses which are derivable relative to that unit's internal address given the positions of other units in the tree-based structure.

For each message sent from the root unit comprising a destination address of an individually addressable entity, that destination address being relative to the root unit's internal address, the method may comprise: at the next intermediate unit adjacent to the root unit: (i) receiving the message from the root unit; (ii) rebasing the message by adding an offset to the destination address to form a rebased destination address, the rebased destination address being relative to the intermediate unit's internal address; and (iii) routing the rebased message onto the individually addressable entity.

Each individually addressable entity may have an address index, and each unit may have one or more address indices.

The method may comprise determining the offset to be −m, where m is the number of address indices allocated to the next intermediate unit and a local subsystem directly connected to the next intermediate unit.

Prior to determining that a unit is defective, each crosslink may have 0 address indices.

Reconfiguring the address of the crosslink may comprise allocating to that crosslink an address index.

The crosslink may be allocated an address index of 1.

The method may comprise: from the units that did not respond to the discovery message, determining the unit closest to the root unit in the branch to be the defective unit.

The first unit may be adjacent to the defective unit, the defective unit being between the first unit and the root unit in the branch.

The method may further comprise: in response to failing to enable the crosslink between the first unit and second unit, determining that the first unit is also defective; enabling a further crosslink between a third unit in the same branch as the defective units and a fourth unit in an adjacent branch, the third unit being adjacent to the first unit, the first unit being between the third unit and the defective unit; sending another discovery message; receiving another discovery response from the fourth unit identifying the number of individually addressable entities in that fourth unit, those units in the branch above that fourth unit, the third unit, and those units in the branch above the third unit; and reconfiguring the address of the further crosslink so as to cause a subsequent communication to an individually addressable entity in the defective unit's branch to be routed via the adjacent branch and the further crosslink, thereby bypassing the defective units.

Each unit may be connected to the unit above in the branch by a non-configurable link, and connected to the unit below in the branch by a non-configurable link.

Each crosslink may be configurable.

BRIEF DESCRIPTION OF THE DRAWINGS

The present disclosure will now be described by way of example with reference to the accompanying drawings. In the drawings.

DETAILED DESCRIPTION

The following disclosure describes a monitoring network suitable for implementation on a SoC or an MCM.

FIGS. 1 to 3, 5 to 8, and 10 to 12 are schematic diagrams of exemplary system architectures, and components within the system architectures. These figures present the structures in terms of functional blocks. Some functional blocks for carrying out functions well known in the art have in places been omitted from these figures. FIGS. 4 and 9 are flowcharts illustrating methods of routing messages through the monitoring circuitry. Each flowchart depicts an order in which the method of that flowchart can be performed. However, the flowcharts are not intended to restrict the described methods to being implemented in the orders depicted. The steps of the methods may be carried out in alternative orders to those depicted in the flowcharts.

Figure 1:
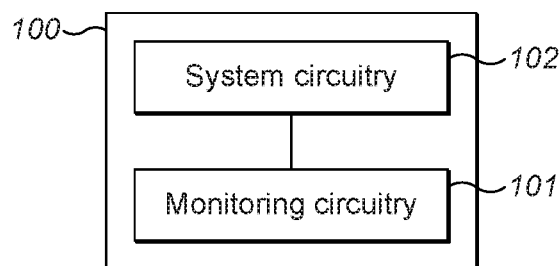
FIG. 1 is a schematic drawing of an exemplary monitoring network on an integrated circuit chip device.
Figure 2:
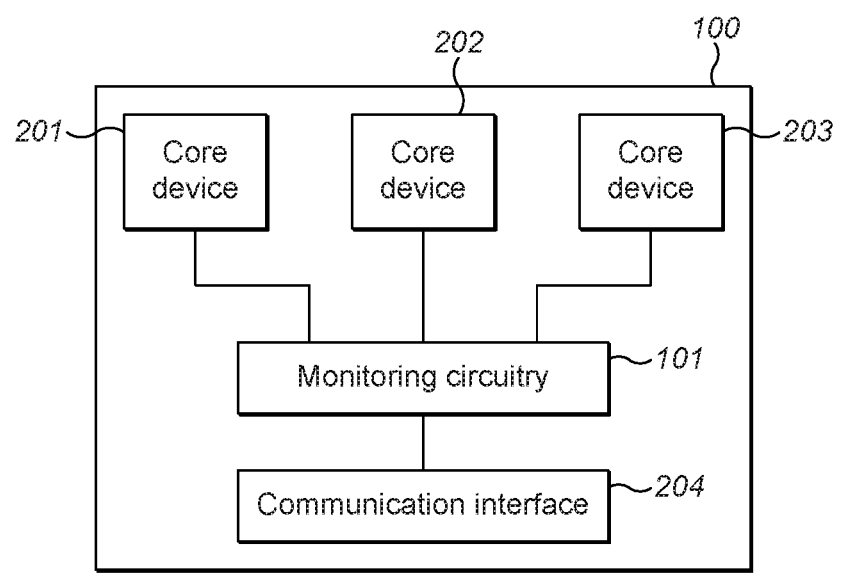
FIG. 2 is a schematic drawing of an exemplary monitoring network on an integrated circuit chip device.

FIG. 1 illustrates the general structure of an exemplary monitoring network for a SoC 100. Monitoring circuitry 101 is arranged to monitor system circuitry 102. For example, for the purposes of detecting improper operation of the core devices relating to safety or security concerns. FIG. 2 illustrates exemplary system circuitry comprising core devices and a communication interface. Core devices 201, 202 and 203 of the SoC are each connected to monitoring circuitry 101. Although FIG. 2 illustrates three core devices, any number of core devices can be suitably integrated into the monitoring network. Exemplary core devices include a DSP (digital signal processor), video processor, applications processor or CPU (central processor unit), graphics processor, system memory, bus, system interconnect, RTOS (real-time operating system), software, data, custom circuit and a data engine. However, any component of a SoC is suitable for being incorporated into the monitoring network as a core device on FIG. 2. The core devices may be emulators or simulators of other devices on the chip. For example, a core device may emulate a processor.

The monitoring circuitry may be able to manipulate the operation of the core devices and monitor the operation of the core devices. The monitoring circuitry is connected to a communication interface 204. Communication interface 204 may be configured to communicate with entities off-chip. For example, monitoring circuitry 101 may communicate with an off-chip analyser via communication interface 204. Communication interface 204 may also be configured to communicate with other entities on-chip. For example, monitoring circuitry 101 may communicate with an on-chip analyser via communication interface 204.

Although FIG. 2 illustrates one communication interface, any number of communication interfaces can be integrated onto the SoC. The communication interfaces implemented are chosen in dependence on the type of connections that are to be made. Exemplary communication interfaces include: JTAG, parallel trace input/output, and Aurora based high-speed serial interface; and reuse of system interfaces such as USB, Ethernet, RS232, PCIe and CAN.

Figure 3:
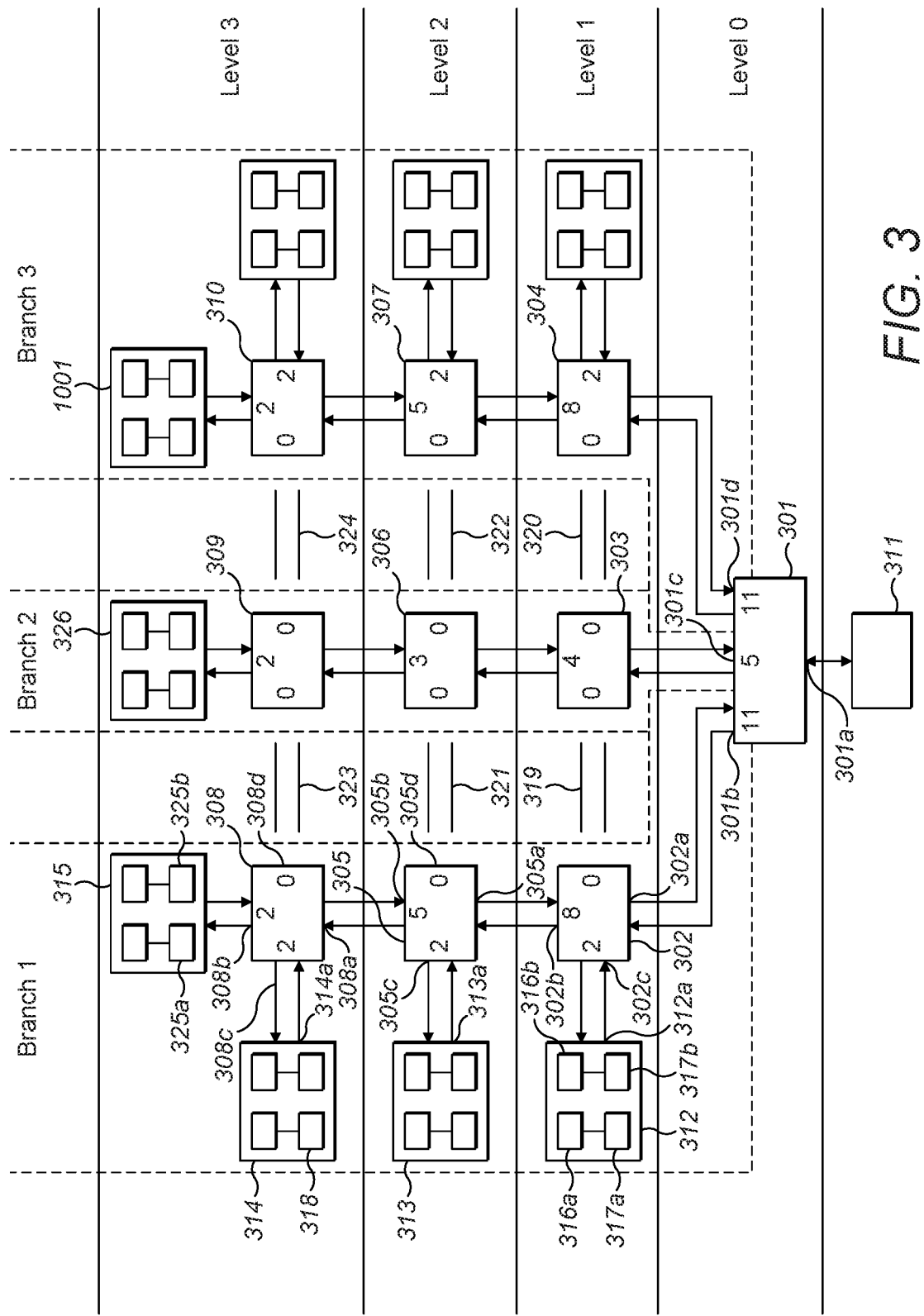
FIG. 3 is a schematic drawing of an exemplary tree-based topology of a monitoring network on an integrated circuit chip device.
Figure 4:
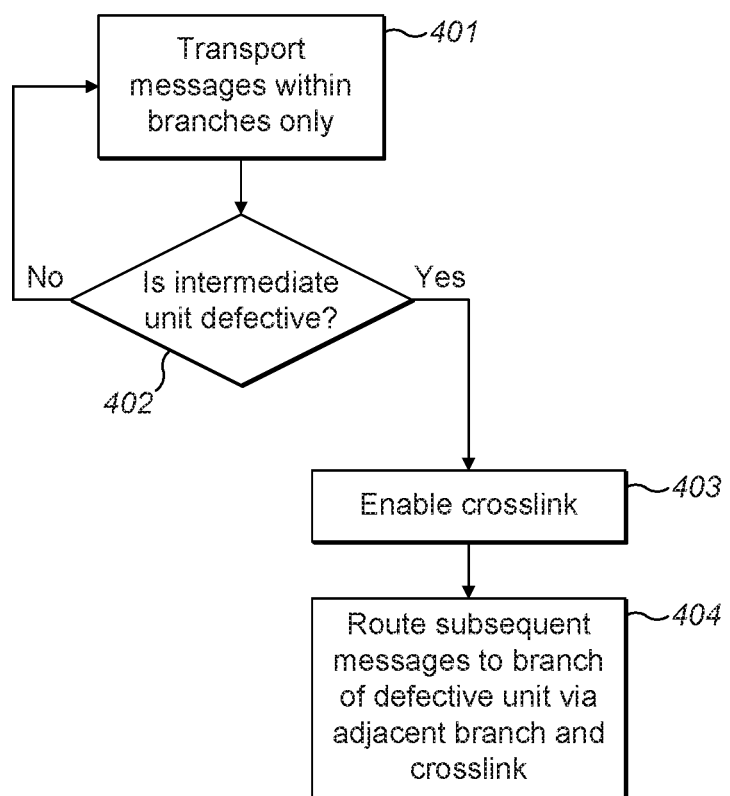
FIG. 4 is a flowchart illustrating a mechanism for enabling a crosslink.

FIG. 3 illustrates an example structure of the SoC. Routing units for routing messages through the monitoring circuitry of the SoC are connected in a tree-based structure. In this example, ten routing units are shown 301, 302, 303, 304, 305, 306, 307, 308, 309 and 310. Unit 301 is a root unit which is at the base of the tree-based structure. The lower port 301*a* of the root unit 301 is connected to a communication interface 311. Different branches of the tree-based structure extend from the upper ports 301*b*, 301*c* and 301*d* of the root unit 301. Thus, the root unit 301 is at the base of each branch of the tree-based structure. Each branch comprises one or more units above the root unit. A first branch extends from upper port 301*b*. That first branch comprises units 302, 305 and 308. A second branch extends from upper port 301*c*. That second branch comprises units 303, 306 and

309. A third branch extends from upper port 301*d*. That third branch comprises units 304, 307 and 310.

The units in a branch are connected in series. Each unit is connected to a single unit below it in the branch. Each unit is connected to a single unit (if there is one) above it in the branch. Each unit has a lower port by which it communicates with the unit below it in the branch. Each unit has an upper port by which it communicates with the unit above it in the branch. Both the lower port and upper port are bidirectional. For example, unit 302 has a lower port 302*a* which is connected to the upper port 301*b* of the root unit 301. Unit 302 receives messages from the root unit 301 via lower port 302*a*, and sends messages to the root unit 301 via lower port 302*a*. Unit 302 also has an upper port 302*b* which is connected to the lower port 305*a* of unit 305. Unit 302 sends messages to unit 305 via upper port 302*b*, and receives messages from unit 305 via upper port 302*b*.

Each unit may be directly connected to one or more local subsystems. In the example illustrated in FIG. 3, unit 302 is directly connected to local subsystem 312. Unit 305 is also directly connected to a single local subsystem 313. Unit 308 is directly connected to two local subsystems 314, 315. Note that the local subsystems directly connected to units 303 and 306 have been omitted from FIG. 3 for ease of illustration. Each unit has a local port 302*c*, 305*c* etc connected to each of its local subsystems. This local port(s) is separate to and different from the upper port and lower port of the unit. This local port may be bidirectional so as to allow communication both from the unit to the local subsystem, and from the local subsystem to the unit.

A local subsystem comprises one or more core devices. It may also comprise one or more analytic modules. It may also comprise one or more further routing units. For example, local subsystem 312 of unit 302 has two core devices 316*a*, 316*b* and two analytic modules 317*a*, 317*b*. Each core device may be connected to its own analytic module. For example, analytic module 317*a* may be connected only to core device 316*a*. Similarly analytic module 317*b* may be connected only to core device 316*a*. Alternatively, one analytic module may be connected to a plurality of core devices.

The analytic modules may be configured to passively or actively observe the attached core device. An analytic module which passively observes a core device is limited to analysing the output of that core device. Conversely, an analytic module which actively observes a core device may analyse the output of the core device, and additionally may control the core device to modify its operation. For example, the analytic module may control the core device to slow down the speed at which the core device operates or to stop a processor of the core device and/or restart it again.

Each analytic module 317*a*, 317*b* is connected to the subsystem port 312*a* of the subsystem.

Each subsystem port comprises a plurality of individual ports, one per analytic module. Thus, subsystem port 312*a* comprises a port for analytic module 317*a* and a separate port for analytic module 317*b*. The analytic module 317*a*, 317*b* generates messages comprising data related to the core device 316*a*, 316*b* the analytic module is observing. For example, those messages may contain trace data of the core device. The analytic module outputs its messages via its individual port of the subsystem port 312*a* to the connected branch unit 302. The analytic module may receive configuration messages via the subsystem port 312*a* from the connected branch unit 302. For example, these configuration messages may instruct the analytic module to change its monitoring of the core device such that it is looking to detect and report different activity. For example, the configuration message may instruct the analytic module to search for a particular value in the output of the core device, or to report when the core device reads from a particular address range in memory.

In an alternative arrangement, a local subsystem may have a plurality of analytic modules and a subsystem port which consists of a single port only. In this case, the local subsystem further comprises a routing unit which routes messages received at the port to an individual analytic module and vice versa.

The tree-based topology described with reference to FIG. 3 routes communications as follows. Communications for a destination unit in a branch are routed to that destination unit via intermediate units in that branch between the root unit 301 and the destination unit. For example, a message intended for analytic module 318 of subsystem 314 is routed from the root unit 301 via its upper port 301*b* to lower port 302*a* of branch unit 302. Branch unit 302 routes the message from its upper port 302*b* to lower port 305*a* of branch unit 305. Branch unit 305 routes the message from its upper port 305*b* to lower port 308*a* of branch unit 308. Branch unit 308 outputs the message from its local port 308*c* to subsystem port 314*a* of subsystem 314. The message is then passed to analytic module 318. Communications from a branch unit to the root unit 301 are routed in a corresponding manner down a branch. Thus, all primary communications in the system are routed up and down branches only.

In the arrangement illustrated in FIG. 3, the root unit 301 routes data off-chip. The communication interface 311 illustrated is a USB port. The connection between the communication interface 311 and the root unit 301 is bi-directional. The root unit 301 outputs data received from the monitoring circuitry to the communication interface 311 for transport off chip. This data may include trace data. This data may include event data. The communication interface 311 also sends messages to the root unit 301 received from an off-chip device, for example an off-chip analyser. This data may include configuration messages for configuring one or more of the monitoring units. The root unit 301 routes messages from the communication interface 311 up to the addressed units in the branches.

Alternatively, or additionally, the root unit 301 may be connected to an on-chip analyser. In this case, the root unit 301 may route messages received from the monitoring circuitry to that on-chip analyser. The root unit 301 may route messages received from that on-chip analyser to the monitoring units via the tree-based topology described above.

Typically, the components on a SoC are arranged in a tiled array. In other words, the components are arranged in a square grid. The tree-based monitoring network described with reference to FIG. 3 is constructed on chip to fit around the SoC components. The physical layout of the branch units is thus in a regular tiled arrangement as illustrated in FIG. 3 if the components of the SoC are in such an arrangement. However, the physical layout of the branch units can be in a different arrangement so as to fit around the SoC components if they have a different arrangement, whilst still retaining the relative connections between the branch units and routing mechanism of the tree-based topology.

Primary communications relating to the monitoring circuitry are transported around the SoC up and down branches of the tree-based topology as described above. However, as identified in the background section, if one branch unit fails, all those units connected higher in the branch than the failed unit are no longer able to communicate with the root unit via that branch. The network of FIG. 3 addresses this problem.

FIG. 3 illustrates crosslinks which connect branches above the root unit 301. Each crosslink connects corresponding units of adjacent branches. Suitably, each crosslink connects only two units, those two units being in adjacent branches to each other. The units connected by a crosslink are in the same hierarchical level as each other. The units connected by a crosslink may have the same number of intermediate units between them and the root unit in their respective branches.

FIG. 3 illustrates four hierarchical levels. Level 0 comprises the root unit 301. Level 1 is the hierarchical level adjacent to and above level 0. Level 1 comprises branch units 302, 303 and 304. Each of these branch units is directly connected to the root unit 301. Branch unit 303 is adjacent to branch unit 302 and in the same hierarchical level as branch unit 302. Branch units 302 and 303 are connected by crosslink 319. Similarly branch unit 303 is connected to branch unit 304 by crosslink 320.

Level 2 is the hierarchical level adjacent to and above level 1. Level 2 comprises branch units 305, 306 and 307. Each of these branch units has one intermediate unit between it and the root unit in its branch. Branch unit 306 is adjacent to, and in the same hierarchical level as, branch unit 305. Branch units 305 and 306 are thus connected by crosslink 321. Similarly, branch unit 306 is connected to branch unit 307 by crosslink 322.

Finally, level 3 is the hierarchical level adjacent to and above level 2. Level 3 comprises branch units 308, 309 and 310. Each of these branch units has two intermediate units between it and the root unit in its branch. Corresponding branch units 308 and 309 are in adjacent branches and connected by crosslink 323. Corresponding branch units 309 and 310 are in adjacent branches and connected by crosslink 324.

Each branch unit has a crosslink port for each crosslink that it is connected to. Each crosslink is configurable. Specifically, the direction of the crosslink is configurable. For a crosslink connecting a first unit in a first branch to a second unit in a second branch, that crosslink is configurable to either:

1. send upstream messages from the root unit from the first unit to the second unit, and to send downstream messages to the root unit from the second unit to the first unit; or
2. send upstream messages from the root unit from the second unit to the first unit, and to send downstream messages to the root unit from the first unit to the second unit.

By contrast, the direction of the links connecting the upper and lower ports of the branch units within the branches are not configurable.

Crosslinks are not initially used for primary communications routing messages related to the monitoring circuitry around the SoC. However, if a branch unit is deemed defective, then a crosslink is enabled to bypass the defective unit. This is described further with reference to FIG. 4.

FIG. 4 is a flowchart illustrating a scenario in which a crosslink is utilised. At step 401 messages are transported up and down the branches of the SoC only. At step 402 a determination is made as to whether there is a defective branch unit in the SoC. If the answer is NO, then the method returns to step 401, where messages continue to be transported up and down the branches of the SoC only. However, if the answer at step 402 is YES, then the method proceeds to step 403. At step 403, in response to the unit being deemed defective, a crosslink is enabled between the branch unit above the defective unit in the same branch as the defective unit, and a corresponding unit in an adjacent branch. Then at step 404, subsequent messages to a destination unit in the same branch as the defective unit are routed from the root unit via the adjacent branch and the enabled crosslink. The defective unit is thereby bypassed.

Figure 5:
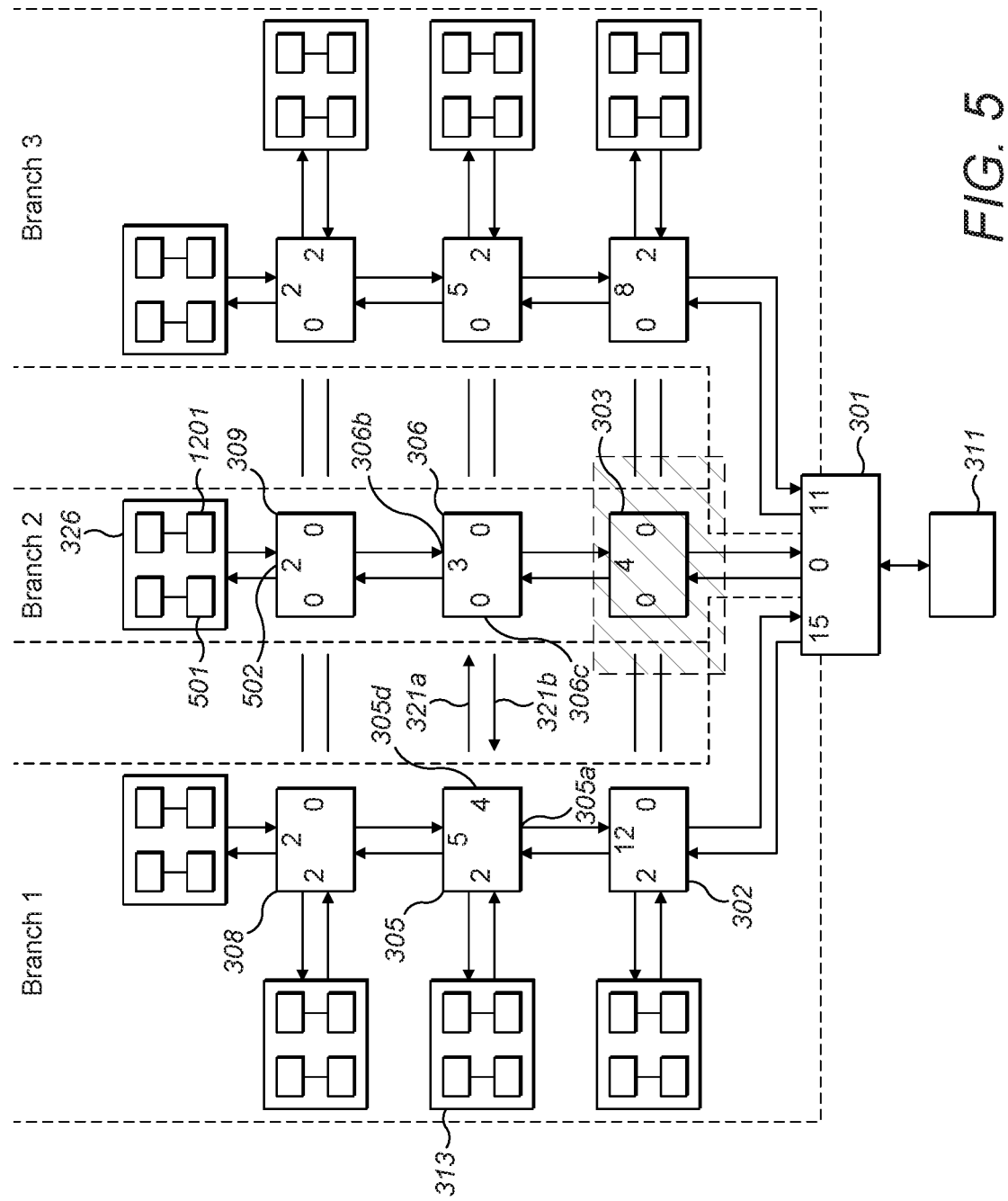
FIG. 5 illustrates an example of a defective unit in the SoC.

FIG. 5 illustrates a first example of a unit being deemed defective in the SoC. In FIG. 5, branch unit 303 is deemed defective at step 402 of the method of FIG. 4. Branch unit 303 is in the second branch. Defective unit 303 prevents messages being routed to and from the analytic modules in the second branch, i.e. to and from the analytic modules in local subsystem 326. In response to this, crosslink 321 is enabled. Crosslink 321 is between branch unit 305 in the first branch and branch unit 306 in the second branch. Branch unit 306 is adjacent to the defective unit 303 in the same branch as defective unit 303. Defective unit 303 is between branch unit 306 and root unit 301. Crosslink 321 is enabled as follows.

In response to detecting that unit 303 is defective, the root unit 301 sends a reconfiguration command to unit 305 in the first branch. The root unit 301 may have received this reconfiguration command from the off-chip (or on-chip) analyser which identified the defective unit. In response to receiving the reconfiguration command, unit 305 reconfigures itself to (i) route communications received at its lower port 305a for a destination unit in the second branch through crosslink 321 via crosslink port 305d, and (ii) route communications received at crosslink port 305d from crosslink 321 to the root unit 301 via its lower port 305a.

In response to receiving the reconfiguration command, unit 305 also sends a reconfiguration command on the crosslink 321 to unit 306. In response to receiving this reconfiguration command, unit 306 reconfigures itself to (i) route communications received at its upper port 306b for the root unit through crosslink 321 via crosslink port 306c, and (ii) route communications received at crosslink port 306c to a destination unit in the second branch via its upper port 306b.

Thus, unit 305 configures the direction of the crosslink 321 such that the uplink 321a routes messages from unit 305 to unit 306, and the downlink 321b routes messages from unit 306 to unit 305. The crosslink is thus enabled to bypass defective unit 303, thereby enabling units above defective unit 303 in the second branch to send and receive messages.

Figure 6:
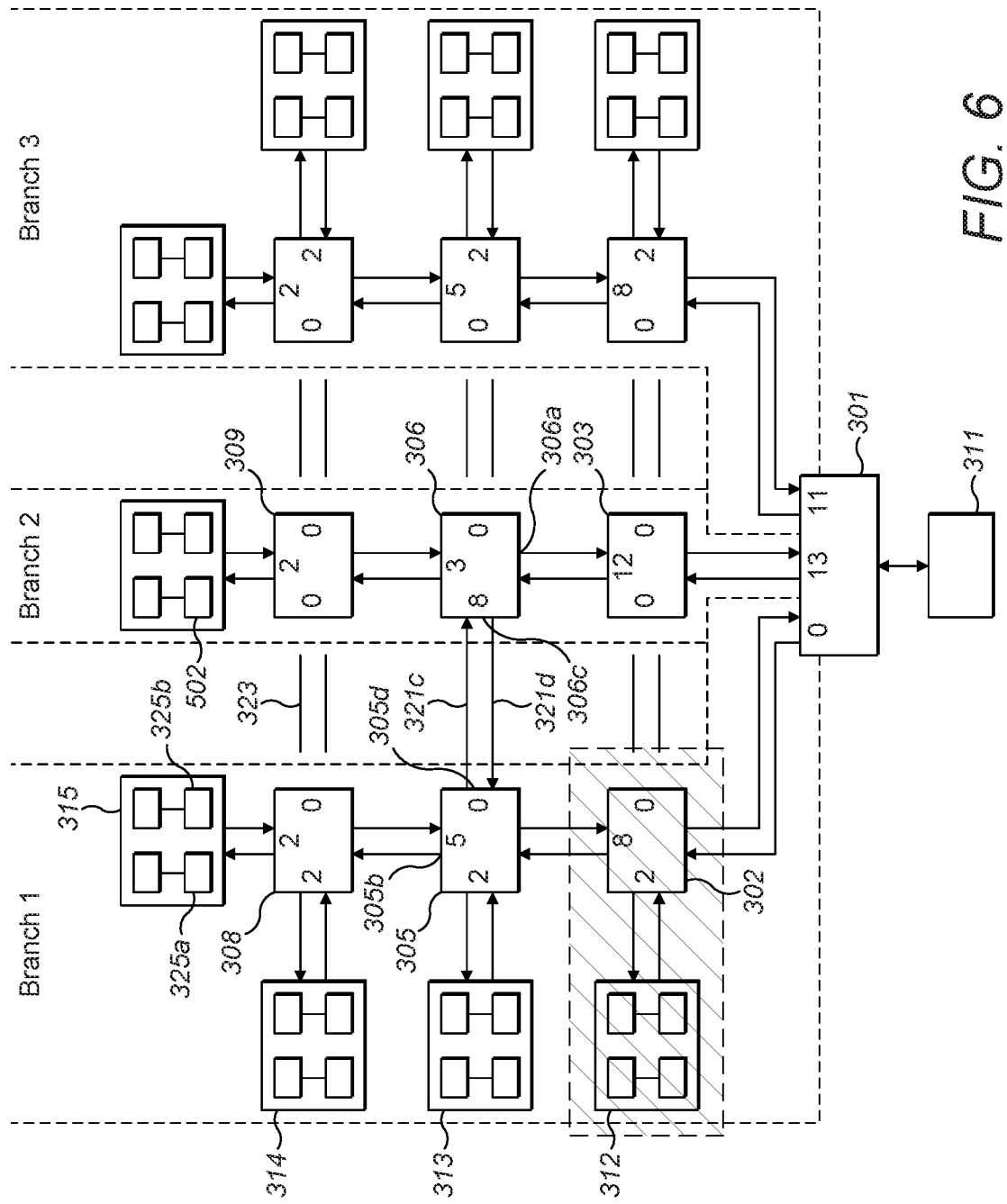
FIG. 6 illustrates another example of a defective unit in the SoC.

FIG. 6 illustrates a second example of a unit being deemed defective in the SoC. In FIG. 6, branch unit 302 is deemed defective at step 402 of the method of FIG. 4. Branch unit 302 is in the first branch. Defective unit 302 prevents messages being routed to and from the analytic modules in the first branch, i.e. from the analytic modules in local subsystems 312, 313, 314 and 315. In response to this, crosslink 321 is enabled. Crosslink 321 is between branch unit 305 in the first branch and branch unit 306 in the second branch. Branch unit 305 is adjacent to the defective unit 302 in the same branch as defective unit 302. Defective unit 302 is between branch unit 305 and root unit 301. Crosslink 321 is enabled as follows.

In response to detecting that unit 302 is defective, the root unit 301 sends a reconfiguration command to unit 306 in the second branch. The root unit 301 may have received this reconfiguration command from the off-chip (or on-chip) analyser which identified the defective unit. In response to receiving the reconfiguration command, unit 306 reconfigures itself to (i) route communications received at its lower port 306a for a destination unit in the first branch through crosslink 321 via crosslink port 306c, and (ii) route communications received at crosslink port 306c from crosslink 321 to the root unit 301 via its lower port 306a.

In response to receiving the reconfiguration command, unit 306 also sends a reconfiguration command on the crosslink 321 to unit 305. In response to receiving this reconfiguration command, unit 305 reconfigures itself to (i) route communications received at its upper port 305b for the root unit through crosslink 321 via crosslink port 305d, and (ii) route communications received at crosslink port 305d to a destination unit in the first branch via its upper port 305b.

Thus, unit 306 configures the direction of the crosslink 321 such that the uplink 321c routes messages from unit 306 to unit 305, and the downlink 321d routes messages from unit 305 to unit 306. The crosslink is thus enabled to bypass defective unit 302, thereby enabling units above defective unit 302 in the first branch to send and receive messages.

The examples of FIGS. 5 and 6 illustrate that the same crosslink 321 has two configurations, the uplink and downlink directions in those two configurations being opposite. The crosslink is configurable to adopt either configuration. The configuration adopted depends on which of the branches that the crosslink connects has the defective unit.

Figure 7:
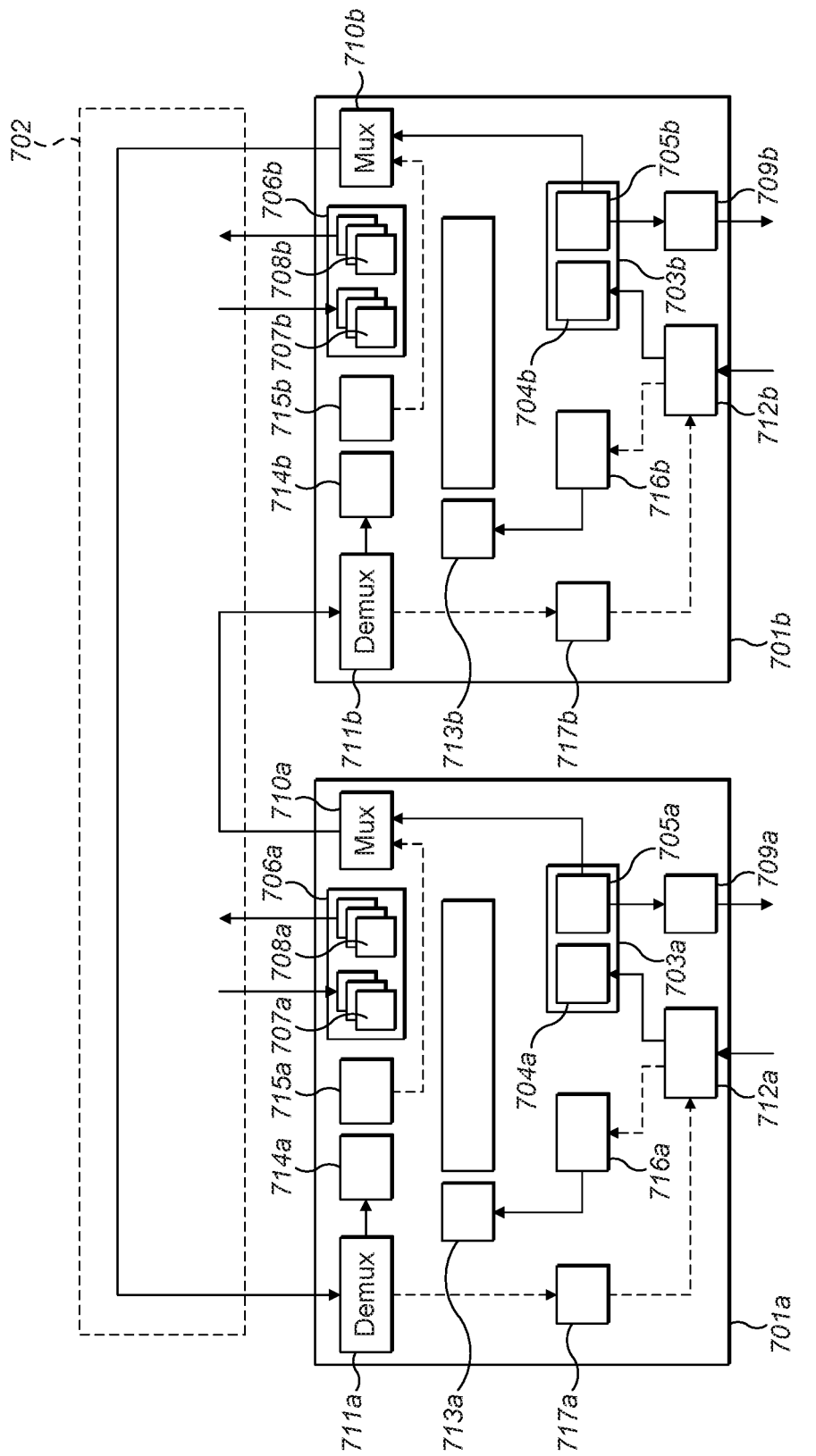
FIG. 7 illustrates an example internal structure of branch units connected by a crosslink.

FIG. 7 illustrates an example internal structure of a branch unit. In FIG. 7, two branch units 701a, 701b in the same hierarchical level of adjacent branches are illustrated. These two branch units are connected by a crosslink 702. Each branch unit comprises a control module 713a, 713b for controlling the routing of received messages. Each branch unit comprises a lower port 703a, 703b having a lower ingress 704a, 704b for receiving upstream messages, and a lower egress 705a, 705b for sending messages downstream. Each branch unit comprises a further port 706a, 706b. This further port comprises an upper port having an upper ingress 707a, 707b for receiving downstream messages, and an upper egress 708a, 708b for sending upstream messages. The further port may comprise one or more further local ports for communicating with a local subsystem, each local port having an ingress for receiving messages from the local subsystem and an egress for sending messages to the local subsystem.

The branch units comprise further componentry to enable them to route messages through the crosslink 702 in either direction. Each branch unit comprises a crosslink port having an ingress 714a, 714b and an egress 715a, 715b. Each branch unit comprises a demultiplexer (DeMUX) 711a, 711b. The DeMUX is connected to the crosslink port, and receives messages from the other branch unit via the crosslink 702. The DeMUX is configured to selectively output messages received on the crosslink either to the crosslink ingress 714a or the lower ingress 704a. The DeMUX selects the output in response to a reconfiguration command received from the root unit. Thus, for example, if the crosslink is enabled to route downstream messages from branch unit 701b to branch unit 701a to root unit 301, then DeMUX 711a selectively routes messages received over crosslink 702 to crosslink ingress 714a. Whereas, if the crosslink is enabled to route upstream messages from the root unit 301 to the branch unit 701b to the branch unit 701a, then DeMUX 711a selectively routes messages received over crosslink 702 to lower ingress 704a.

The DeMUX may output messages to a reduced ingress 716a, 716b via a gearbox 717a, 717b. The gearbox 717a, 717b implements a narrower when the width of downstream messages is greater than the width of upstream messages. The reduced ingress 716a, 716b routes all messages to the control module 713a, 713b. The reduced ingress 716a, 716b has no message FIFOs, event FIFOs or routing control.

The branch unit comprises a message switch 712a, 712b which is a 2×2 switch which receives as inputs: (i) the output of the DeMUX 711a, 711b, and (ii) the upstream input from the branch unit below in the branch. The switch has outputs to: (i) the lower ingress 704a, 704b, and (ii) the reduced ingress 716a, 716b. The downstream output from the lower egress 705a, 705b is gated by gate 709a, 709b.

Each branch unit further comprises a multiplexer MUX 710a, 710b. The MUX outputs messages on the crosslink 702 to the other branch unit. The MUX selectively outputs from either the crosslink egress 715a, 715b or the lower egress 705a, 705b. The MUX selects the input in response to a reconfiguration command received from the root unit. Thus, for example, if the crosslink is enabled to route upstream messages from root unit 301 to branch unit 701a to branch unit 701b, then MUX 710a selectively routes messages from crosslink egress 715a to crosslink 702. Whereas, if the crosslink is enabled to route downstream messages from branch unit 701a to branch unit 701b to root unit 301, then MUX 710a selectively routes messages from lower egress 705a to crosslink 702.

Thus, the MUX of each branch unit on one side of the crosslink outputs messages to the DeMUX of the branch unit on the other side of the crosslink. And the DeMUX on each branch unit on one side of the crosslink receives messages from the MUX of the branch unit on the other side of the crosslink.

FIG. 7 illustrates the message flow in the branch units when they are configured to operate in a default state in which the crosslinks are not utilised for primary communications through the tree-based network. The message flow is illustrated on FIG. 7 by dotted lines. The MUX 710a, 710b is configured to route messages from the crosslink egress 715a, 715b onto the crosslink 702. The DeMUX 711a, 711b is configured to route messages from the crosslink 702 to the reduced ingress 716a, 716b. The message switch 712a, 712b is configured to route the output of the DeMUX 711a, 711b to the reduced ingress 716a, 716b. In this configuration, the crosslink is not enabled to route messages between the root unit and a destination unit via the crosslink. In this configuration, the crosslink is enabled such that either unit connected to the crosslink can reconfigure the other unit. This enables the crosslink to be configured in either direction.

Figure 8:
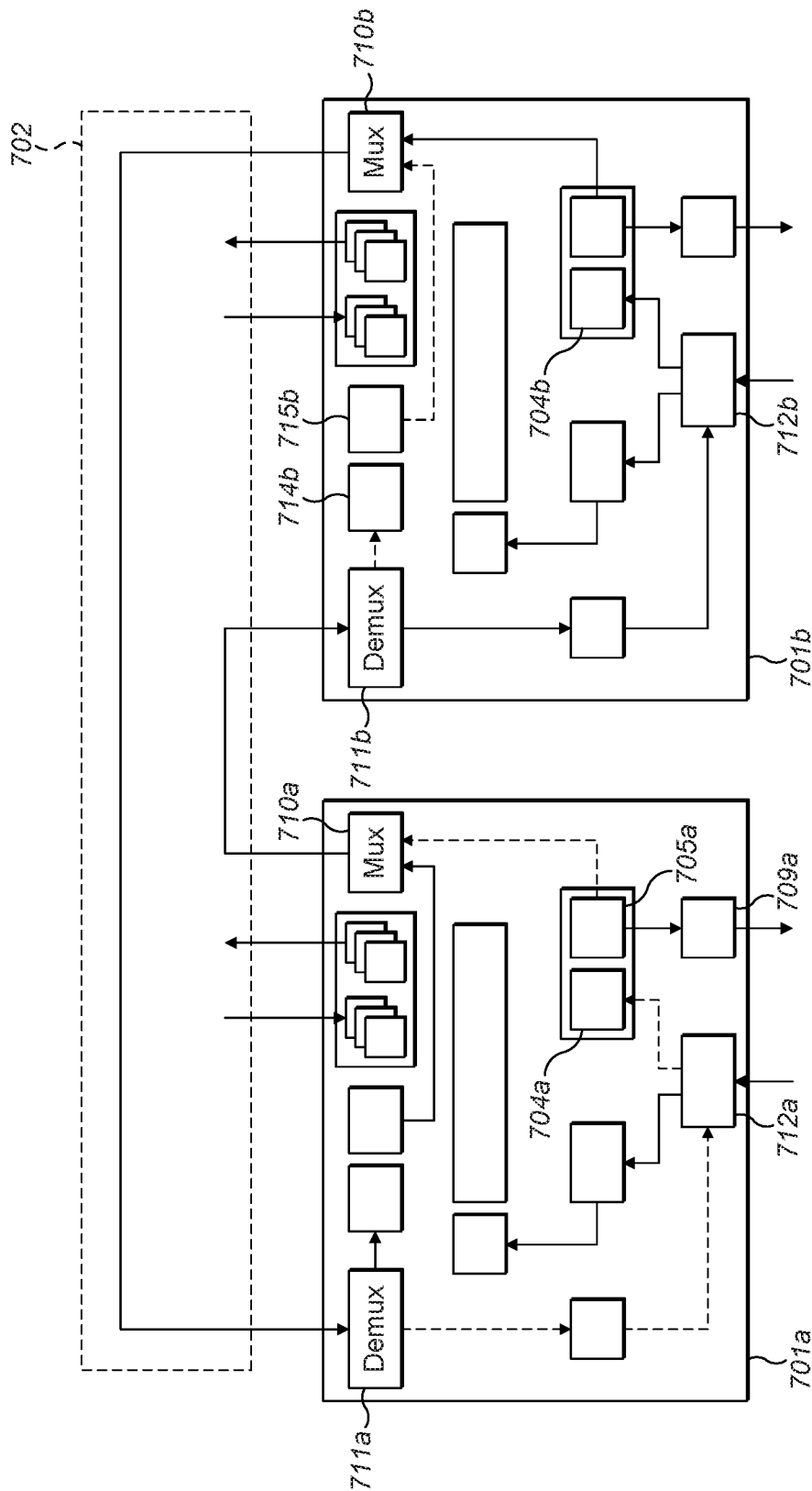
FIG. 8 illustrates the branch units of FIG. 7 configured to transport upstream and downstream messages over the crosslink.
Figure 9:
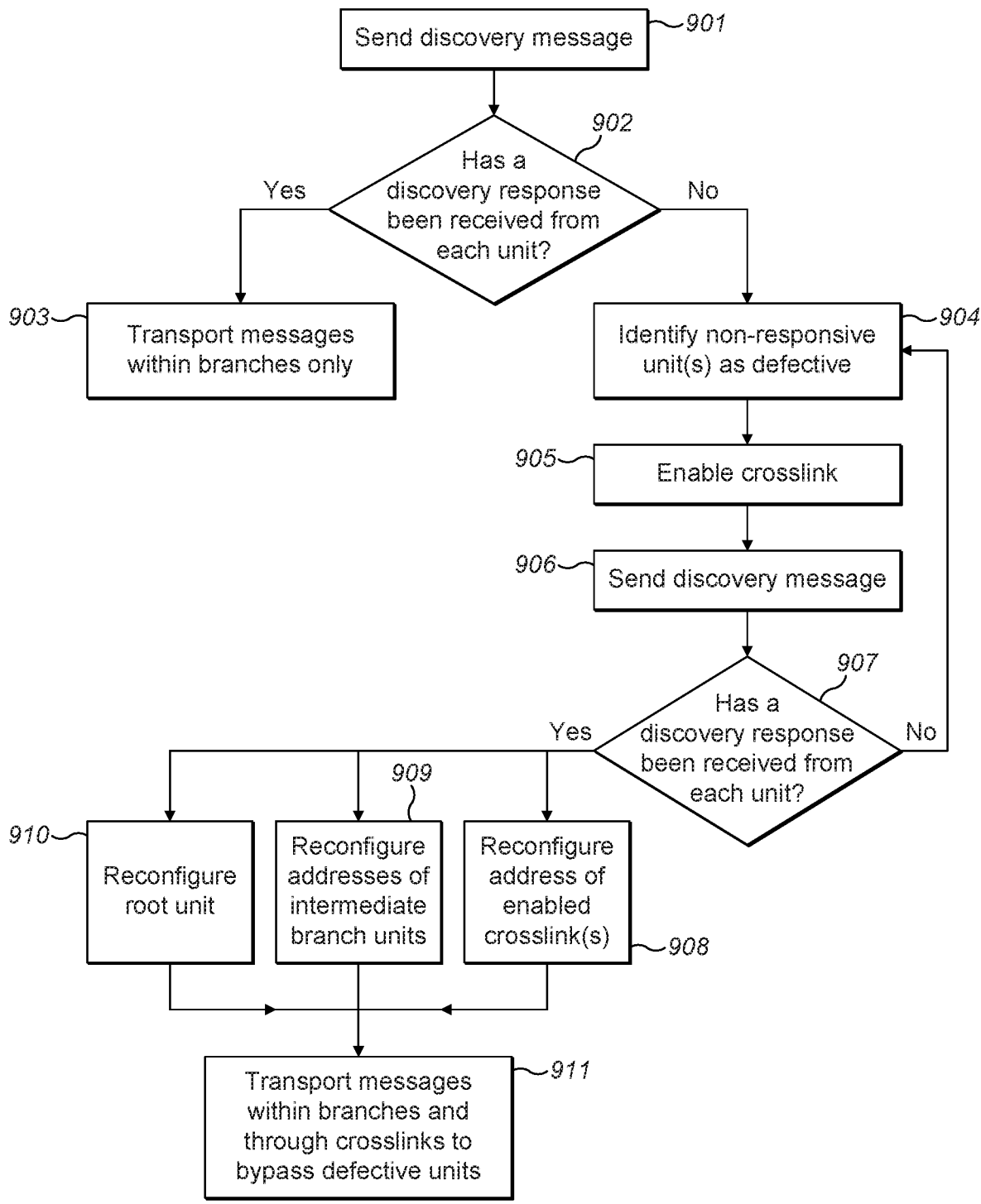
FIG. 9 is a flowchart illustrating a mechanism for determining that a unit is defective, and bypassing that defective unit in subsequent communications.

FIG. 8 illustrates the internal configuration of the branch units 701a, 701b of FIG. 7 when the crosslink is enabled to bypass a defective branch unit in the same branch as unit 701a.

FIG. 8 illustrates the internal configuration of the branch units for the scenario illustrated in FIG. 6, in which branch unit 701a is equivalent to branch unit 305, and branch unit 701b is equivalent to branch unit 306. In this scenario, the crosslink 702/321 is enabled to route upstream messages from unit 701b/306 to unit 701a/305. And the crosslink 702/321 is enabled to route downstream messages from unit 701a/305 to unit 701b/306. Compared to the default configuration of FIG. 7, the unit 701b/306 receives a reconfiguration command from root unit 301. In response to this reconfiguration command, it (i) configures MUX 710b to route messages from crosslink egress 715b to crosslink 702/321; and (ii) configures DeMUX 711b to route messages received from crosslink 702/321 to crosslink ingress 714b.

In response to the reconfiguration command, the unit 701b/306 also sends a reconfiguration command to unit 701a/305 over the crosslink 702/321. In response to receiving this reconfiguration command, the unit 701*a*/305 (*i*) configures MUX 710*a* to route messages from its lower egress 705*a* to the crosslink 702/321; and (ii) configures DeMUX 711*a* to route messages received from crosslink 702/321 to lower ingress 704*a*. Unit 701*a*/305 may also configure its message switch 712*a* to route messages from the crosslink 702/321 via DeMUX 711*a* to its lower ingress 704*a*. This also prevents inputs from the defective unit 302 from being connected to the lower ingress 704*a*, and hence avoids spurious outputs from defective unit 302 from being routed through the system. Unit 701*a*/305 may also configure its gate 709*a* to gate the output from lower egress 705*a* so as to prevent messages from being output from unit 701*a*/305 to the defective unit 302. This saves power since it avoids the defective component receiving and processing messages.

More than one defective unit may be bypassed using the methods described above. If two defective units are in the same branch and adjacent to each other, then the same crosslink can be utilised to bypass both defective units. If two defective units are in the same branch but not adjacent to each other, then different crosslinks can be utilised to bypass the defective units, with one bypass route for each defective unit. If the defective units are in different branches, then different crosslinks can be utilised to bypass the defective units, with one bypass route for each defective unit.

The following describes a method by which one or more branch unit is deemed defective, and an addressing mechanism which can be used to cause branch units to bypass the defective unit when routing messages through the tree-based system.

The addressing mechanism protocol described below allocates an address to each individually addressable entity in the system. Communications to and from an individually addressable entity are routed through the system via intermediate branch units in accordance with the address of the individually addressable entity. Each branch unit routes communications to and from individually addressable entities above that unit in its branch. It may also route communications to and from individually addressable entities in an adjacent branch via a crosslink to bypass a defective unit, as described above.

FIG. 9 is a flowchart illustrating a mechanism for determining that a unit is defective, and bypassing that defective unit in subsequent communications. At step 901, the root unit 301 sends a discovery message. This may be a single discovery message which is sent to all branch units in the tree-based structure. Alternatively, an individual discovery message may be sent from the root unit 301 to each individually addressable entity in the system. For example, each individually addressable entity may be sent a discovery message in turn. The root unit 301 receives discovery responses from the units in the system. Each discovery response identifies the number of individually addressable entities in that unit and those units in the branch above that unit.

At step 902, an assessment is made as to whether a discovery response has been received from each unit. For example, the root unit may be configured to wait for a predetermined time T for a response to the discovery request. If no response is received from a unit in that time T, the unit is deemed to be non-responsive. If a discovery response is received from every unit, then the answer to step 902 is YES. If this is the case then, at step 903, primary communications of the monitoring network are transported only within the branches of the tree-based structure as normal. If the answer at step 902 is NO, then that indicates that there is one or more defective unit in the same branch as the non-responsive unit(s). It does not necessarily indicate that each non-responsive unit is defective. For example, in the example of FIG. 6, no response to the discovery request will be received from any of the units in the first branch, even though only unit 302 is defective.

At step 904, one or more of the non-responsive units are identified as defective. The non-responsive unit which is in the hierarchical level closest to the root unit may be deemed defective. In other words, the non-responsive unit which has the fewest intermediate units between it and the root unit may be deemed defective. Suitably, this is the only non-responsive unit that is deemed defective at this stage.

At the next step 905, a crosslink is enabled between a first unit in the same branch as the defective unit and a second unit in an adjacent branch. Suitably, the first unit is adjacent to the defective unit in the same branch as the defective unit. The defective unit is between the first unit and the root unit in the branch. Referring to the example of FIG. 6, the crosslink which is enabled would be crosslink 321, since this crosslink connects units 305 and 306, and unit 305 is adjacent to defective unit 302 in the same branch as defective unit 302.

At the next step 906, the root unit 301 sends a further discovery message. As with the discovery message of step 901, the further discovery message may be a single discovery message sent to all branch units in the tree-based structure. Alternatively, an individual discovery message may be sent from the root unit 301 to each individually addressable entity in the system. The root unit 301 receives discovery responses from the units in the system. Each discovery response identifies the number of individually addressable entities in that unit and those units in the branch above that unit. If the crosslink of step 905 has been successfully enabled, then the discovery response from the second unit will differ from that second unit's discovery response to the discovery request of step 901. Specifically, the second unit's discovery response will identify a larger number of individually addressable entities to which it can route messages compares to that second unit's discovery response to the discovery request of step 901. If the crosslink of step 905 has been successfully enabled, then the number of individually addressable entities the second unit identifies in its discovery response will be the total of those: (i) in the second unit, (ii) in units in the branch above the second unit, (iii) in the first unit, and (iv) in any accessible units in the branch above the first unit.

Optionally, at step 907, the root unit assesses whether it has received a discovery response from each non-defective unit in the system. For example, the root unit may be configured to wait for a predetermined time T for a response to the discovery request. If no response is received from a unit in that time T, the unit is deemed to be non-responsive. If the answer is YES, then all the defective units have been successfully bypassed. If the answer is NO, then there is a further defective unit in the system.

If the number of individually addressable entities identified in the discovery response of the second unit at step 906 is greater than the corresponding number identified at step 901, then the crosslink was successfully enabled. In this case, if the answer to step 907 is NO, then this indicates that there is a further defective unit elsewhere in the system. For example, unit 308 may be defective in the example of FIG. 6. The process from step 904 to 907 repeats. In this iteration, the next non-responsive unit to be deemed defective is the non-responsive unit which is in the hierarchical level closest to the root unit, excluding the non-responsive unit already deemed defective.

If the number of individually addressable entities identified in the discovery response of the second unit at step 906 is the same as the corresponding number identified at step 901, then the crosslink was not successfully enabled. In this case, if the answer to step 907 is NO, then at the next iteration of step 904, the root unit may determine that the first unit is also defective. Referring to FIG. 6, this would mean that both units 302 and 305 in the first branch are defective. At step 905, a crosslink is enabled between a third unit in the same branch as the defective units, and a fourth unit in an adjacent branch. The third unit is adjacent to the first unit. The first unit is between the third unit and the defective unit. Referring to FIG. 6, if both units 302 and 305 are deemed defective, then the crosslink 323 is enabled. Crosslink 323 is between branch units 308 and 309. Branch unit 308 is adjacent to defective unit 305 in the first branch.

The iterative loop from step 904 to step 907 continues until discovery responses are received from all non-defective units in the system. Once, the defective units have been identified from the set of non-responsive units, the method moves onto steps 908, 909 and 910. At step 908, the address of each successfully enabled crosslink is reconfigured so as to cause subsequent communications to an individually addressable entity in a defective unit's branch to be routed via the adjacent branch and the enabled crosslink, thereby bypassing the defective unit.

At step 909, the address of each intermediate unit of the adjacent branch between the second unit and the root unit are reconfigured so as to cause subsequent communications to an individually addressable entity in the defective unit's branch to be routed via the second unit. In the example of FIG. 6, this entails reconfiguring the address of unit 303 of the second branch in order to cause unit 303 to route messages intended for units 305 and above in the first branch through the second branch to unit 306 and crosslink 321.

At step 910, the root unit 301 is reconfigured in two ways. Firstly, the root unit 301 is reconfigured to prevent it from sending communications directly to the same branch as the defective unit for those communications which are for an individually addressable entity of a destination unit, where the defective intermediate unit is between the root unit and the destination unit. The root unit 301 is also reconfigured to send communications to individually addressable entities in the defective unit's branch via the adjacent branch, for those communications which are for an individually addressable entity of a destination unit, where the defective intermediate unit is between the root unit and the destination unit.

The method then proceeds to step 911, where messages are transported within branches and through enabled crosslinks to bypass defective units.

The following describes an addressing protocol which can be used in conjunction with the methods described above. This addressing protocol utilises a rebasing mechanism. In the rebasing mechanism, each unit considers itself to have the same internal address as the other units in the tree-based network. This internal address is referred to in the following as the base address. Each unit is configured to address other units using addresses which are derivable relative to that unit's internal address given the positions of the other units in the tree-based network. Each unit through which a message is routed on its path to a destination unit rebases the destination address of that message.

So, for example, the root unit sends a message comprising a destination address of an individually addressable entity. That destination address is relative to the root unit's internal address. The root unit sends the message to a branch connected to it. The intermediate unit adjacent to the root unit on that branch receives the message. That intermediate unit rebases the message by adding an offset to the destination address to form a rebased destination address. The rebased destination address is relative to the intermediate unit's internal address. The intermediate then routes the rebased message onto the individually addressable entity.

The rebasing mechanism may utilise address indices. For example, each individually addressable entity of the monitoring system may have an address index. Each branch unit may have one or more address index. Referring to FIG. 3 as an example, each analytic module has a single address index. Branch unit 308 has two address indices which are allocated to the two analytic modules of local subsystem 314 (illustrated as a 2 at the port 308c on FIG. 3), and two address indices which are allocated to the two analytic modules of local subsystem 315 (illustrated as a 2 at the port 308b on FIG. 3). There are no address indices allocated to the crosslink 323 (illustrated as a 0 at port 308d). The branch unit 308 itself has an internal address index of 1. Thus, when responding to the discovery request of step 901, the branch unit 308 reports a total index number of 5 (=2+2+0+1). Branch unit 305 has two address indices allocated to the two analytic modules of local subsystem 313, and five address indices allocated to the branch unit 308 connected to the upper port of unit 305. There are no address indices allocated to the crosslink 321. The branch unit 305 itself has an internal address index of 1. Thus, when responding to the discovery request of step 901, the branch unit 305 reports a total index number of 8 (=2+5+0+1). Branch unit 302 has two address indices allocated to the two analytic modules of local subsystem 312, and eight address indices allocated to the branch unit 305 connected to the upper port of unit 302. There are no address indices allocated to the crosslink 319. The branch unit 303 has an internal address index of 1. Thus, when responding to the discovery request of step 901, the branch unit 303 reports a total index number of 11 (=2+8+0+1).

Upstream messages in the system may be routed by index. Consider the case where the base address is 0. In other words, each unit considers itself to have an internal address of 0. As an upstream message is propagated through the system, the address index of the message is adjusted. For example, if the root unit 301 sends a message to analytic module 325a of local subsystem 315 of branch unit 308, it applies an address index 10 to that message, which is the address of analytic module 325a according to root unit 301. The root unit 301 routes the message onto its upper port 301b. The root unit rebases the address by adding an offset of −n, where n is the number of address indices allocated to the root unit itself. n=1. Thus, the rebased message has a destination address of 9.

Branch unit 302 receives the message. According to branch unit 302, branch unit 302 has address 0, local subsystem 312 has addresses 1-2, and branch unit 305 has addresses 3-11. Branch unit 302 rebases the destination address of the message such that it is the address of analytic module 325a from the viewpoint of branch unit 302. The branch unit rebases the address by adding an offset of −m, where m is the number of address indices allocated to the branch unit itself and the local subsystem directly connected to it, i.e. local subsystem 312. So, in this example, branch unit 302 deducts 3, so the rebased destination address is 6. Branch unit 302 routes the rebased message to its upper port 302b, and from there to branch unit 305.

Branch unit 305 receives the message. According to branch unit 305, branch unit 305 has address 0, local subsystem 313 has addresses 1-2, and branch unit 308 has addresses 3-8. Branch unit 305 rebases the destination address of the message such that it is the address of analytic module 325a from the viewpoint of branch unit 305. As above, branch unit 305 deducts 3, so the rebased destination address is 3. Branch unit 305 routes the rebased message to its upper port 305b, and from there to branch unit 308.

Branch unit 308 receives the message. According to branch unit 308, branch unit 308 has address 0, local subsystem 314 has addresses 1-2, and local subsystem 315 has addresses 3-4. As above, branch unit 308 deducts 3, so the rebased destination address is 0. Branch unit 308 routes the rebased message to its upper port 308b, and from there to local subsystem 315.

Analytic module 325a considers itself to have address index 0, and hence identifies itself as being the destination unit for the received message.

Prior to determining that a unit in the system is defective, each crosslink in the system has 0 address indices. A crosslink may be enabled at step 905 of FIG. 9 by allocating an address index to that crosslink. For example, the crosslink may be allocated an address index of 1. The branch unit above the defective unit which is connected to an adjacent branch by the crosslink may respond to the crosslink being allocated an address index by reconfiguring its DeMUX, MUX, message switch and gate as described above. If the crosslink is not successfully enabled, then the root unit deallocates the address index to the crosslink. The next crosslink above the failed crosslink is then enabled as described above.

An implementation of steps 908, 909 and 910 of FIG. 9 will now be described for the defect example of FIG. 5. In FIG. 5, branch unit 303 is deemed defective. Subsequent communications are routed to the second branch via branch units 302 and 305 of the first branch and crosslink 321. The address of crosslink 321 is reconfigured at step 908 by allocating to it the address indices consumed by branch unit 306 and the units above branch unit 306 in the second branch. Branch unit 306 has one address index, and there are 3 address indices above branch unit 306. Thus, crosslink 321 is allocated an address index of 4 by branch unit 305. Thus, the number of address indices for the redundant link 321 has changed from 0 (as shown in FIG. 3) to 4 (as shown in FIG. 5).

The address of branch unit 305 is reconfigured at step 909 by additionally allocating to it the address indices consumed by crosslink 321. Branch unit 305 has one address index, local subsystem 313 has 2 address indices, the units above branch unit 305 in the first branch have 5 address indices, and the crosslink has 4 indices. Thus, the number of address indices for branch unit 305 has changed from 8 (as shown in FIG. 3) to 12 (as shown in FIG. 5). Thus, branch unit 302 routes messages with 12 address indices to branch unit 305.

The address of branch unit 302 is also reconfigured at step 909 by additionally allocating to it the additional address indices consumed by branch unit 305. Thus, the number of address indices for branch unit 302 has changed from 11 (as shown in FIG. 3) to 15 (as shown in FIG. 5). Thus, root unit 301 routes messages with 15 address indices to branch unit 302.

At step 910, the root unit 301 is reconfigured in two ways. Firstly, the upper port 301b of root unit 301 is reconfigured to send messages with address indices up to 15 to branch unit 302 in the first branch. Secondly, the upper port 301c of root unit 301 is reconfigured to no longer send any messages to branch unit 303 of the second branch.

Thus, as an example, in the re-indexed addressing mechanism, a message would be rooted from root unit 301 to analytic module 501 of local subsystem 326 as follows. The root unit 301 applies an address index 14 to that message, which is the address of analytic module 501 according to root unit 301. The root unit 301 routes this message to its upper port 301b and applies an offset of −1. Branch unit 302 receives the message having an index of 13. Branch unit 302 routes the message to its upper port 302b and applies an offset of −3. Branch unit 305 receives the message having an index of 10. Branch unit 305 routes the message to its crosslink port 305d and applies an offset of −8. Branch unit 306 receives the message having an index of 2. Branch unit 306 routes the message to its upper port 306b and applies an offset of −1. Branch unit 309 receives the message having an index of 1. Branch unit 309 routes the message to its local subsystem port 502 and applies an offset of −1. Local subsystem 326 receives the message having an index of 0. Analytic module 501 considers itself to have address index 0, and hence identifies itself as being the destination address for the received message.

Typically, messages being transported within the tree-based system described above are: in the upstream direction configuration messages for configuring the analytic modules to monitor the system circuitry, and in the downstream direction messages containing monitor data resulting from the analytic modules' monitoring of the system circuitry. In addition to these messages, event messages are transported in the system. An analytic module is configured to generate an event message in response to detecting a particular activity by the core device it is monitoring. For example, an analytic module may be configured to generate an event message in response to its associated core device reading a particular address range from a memory. Suitably, the activities which cause an analytic module to generate an event message are configurable during run-time.

An event message propagates throughout the whole system. Other analytic modules respond to receipt of the event message by taking an action. The action may depend on the content of the event message. The event message may, for example, be indicative of a safety or security concern. In response, the analytic modules may halt the operation of their associated core devices. As another example, in response to the event, they may adapt the activities of their associated core devices which they are monitoring. An event message which is generated at an analytic module in the system is broadcast to all other units in the system. In other words, the event message is cross-triggered throughout the system.

Figure 10:
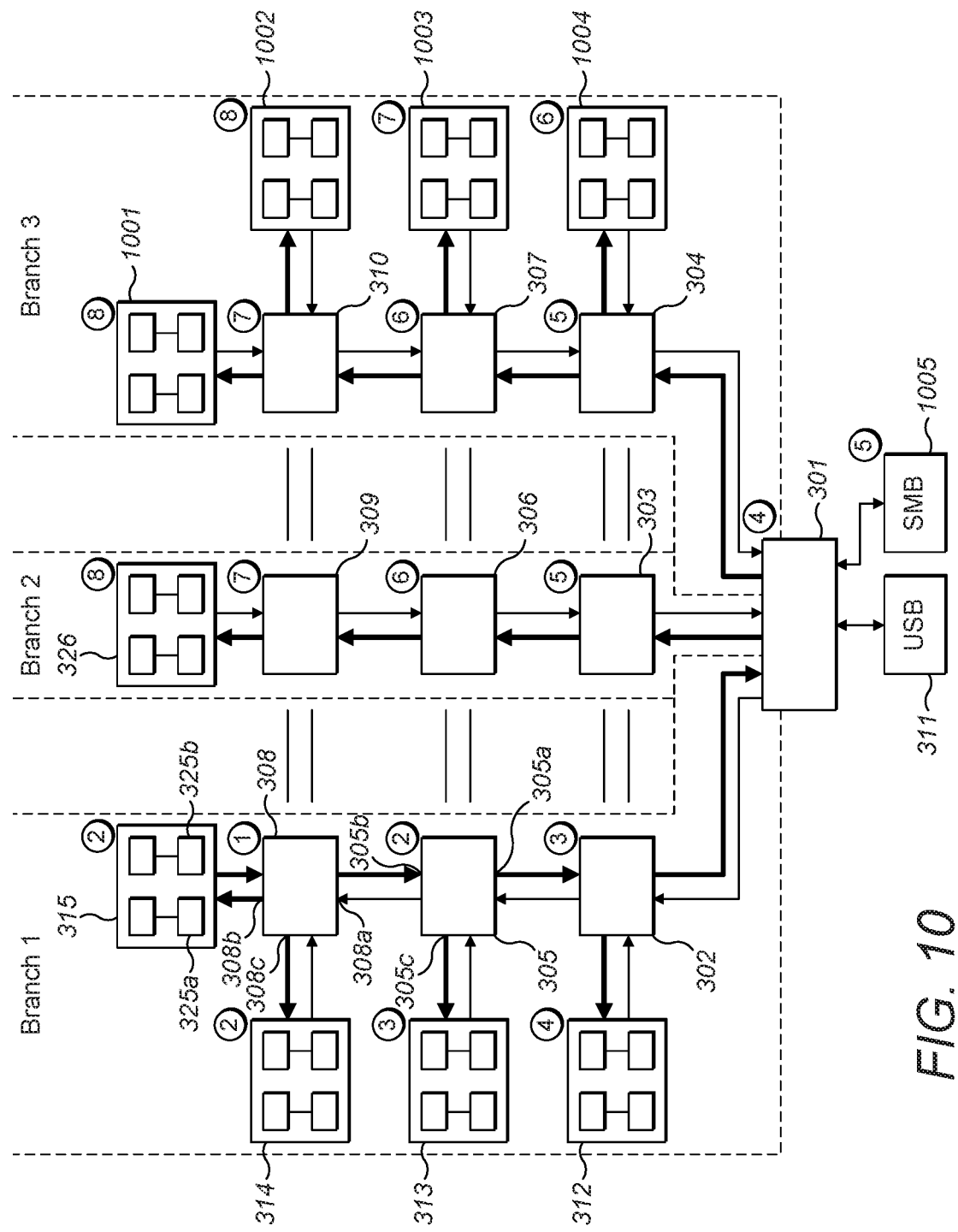
FIG. 10 illustrates an example of an event message being broadcast throughout the monitoring network of FIG. 3.

FIG. 10 illustrates an event message being broadcast throughout the monitoring network of FIG. 3. Each branch unit forwards the event message through the system as well as to its own local subsystem(s). The event message is generated by analytic module 325a in local subsystem 315 of branch unit 308. Analytic module 325a sends the event message to branch unit 308. Branch unit 308 routes the event message upstream to analytic module 325b, to its other local subsystem 314, and downstream to branch unit 305. Branch unit 308 does not send the event message back to analytic module 325a that generated the event message. Branch unit 305 routes the event message to its local subsystem 313 and downstream to branch unit 302. Branch unit 302 routes the event message to its local subsystem 312 and downstream to root unit 301. Root unit 301 routes the event message up the second and third branches and downstream to communication interfaces 311 and 1005. Specifically, root unit 301 routes the event message upstream to branch unit 303 and branch unit 304. Branch unit 303 routes the event message to branch unit 306. Branch unit 306 routes the event message to branch unit 309. Branch unit 309 routes the event message to the analytic modules in local subsystem 326. Corresponding routing applies to the third branch.

A delay of a cycle is incurred at each branch unit as it receives and propagates the event message on. FIG. 10 illustrates the number of cycles that it takes the event message to reach each of the units in the tree-based network, by a number in a circle next to each unit.

Thus, it takes:
1 cycle for the event message to reach the branch unit 308;
2 cycles for it to reach branch unit 305, local subsystem 314 and analytic module 325b;
3 cycles for it to reach branch unit 302 and local subsystem 313;
4 cycles for it to reach root unit 301 and local subsystem 312;
5 cycles for it to reach branch units 303 and 304, and communication interfaces 311 and 1005;
6 cycles for it to reach branch units 306 and 307, and local subsystem 1004;
7 cycles for it to reach branch units 309 and 310, and local subsystem 1003; and
8 cycles for it to reach local subsystems 326, 1001 and 1002.

With this tree-based topology in which messages are transported up and down branches, the highest latency for routing event messages throughout the network is observed between components at the top of the hierarchy in different branches. Thus, although local subsystem 326 is physically close to the local subsystem 315 which generated the event message, it observes the highest latency of 8 cycles for the event message to reach it. This is problematic because typically the analytic modules which are physically closest to the analytic module which generated the event message are the ones which need to respond to the event message most urgently, and hence need to receive the event message most urgently.

Figure 11:
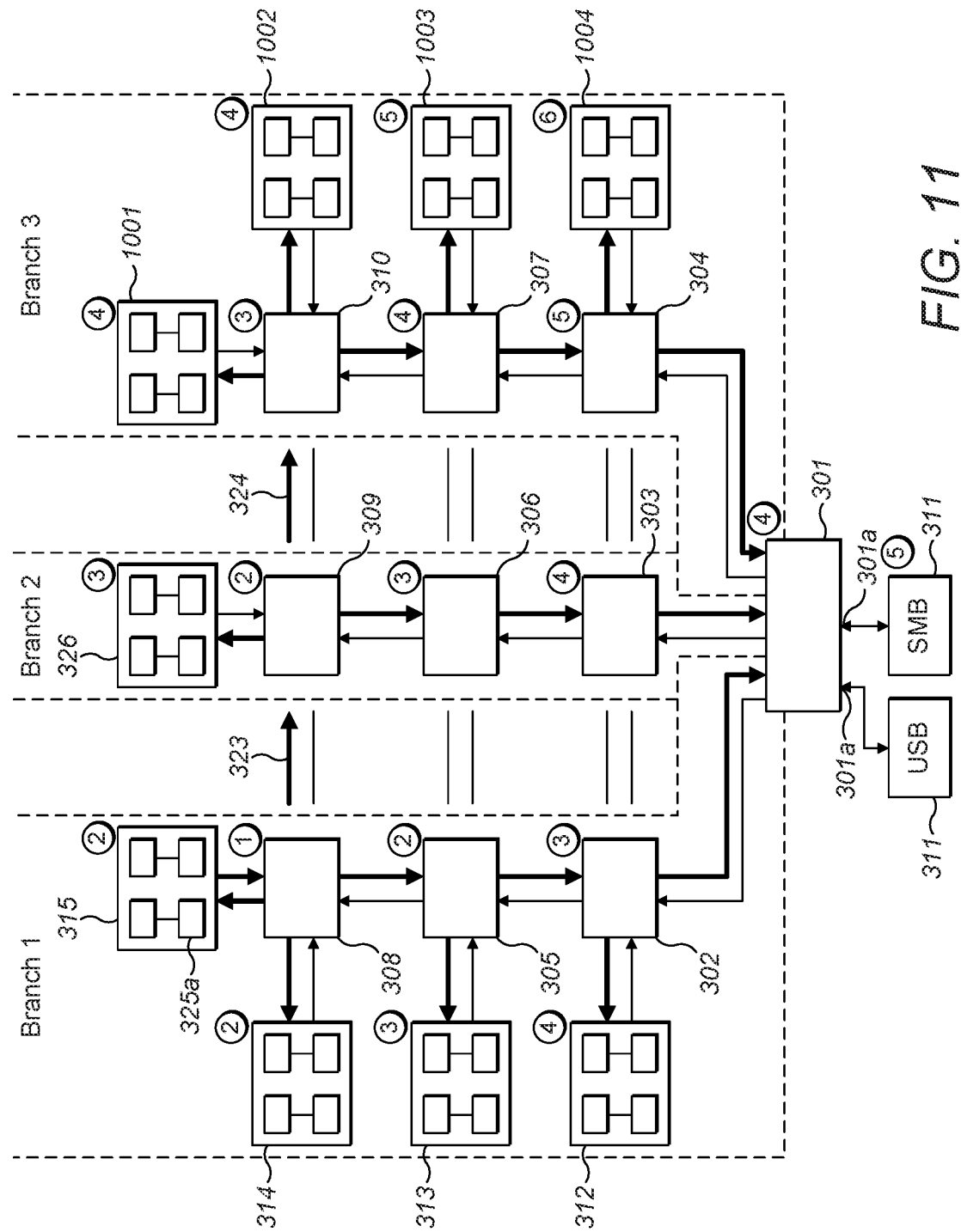
FIG. 11 illustrates an example of an event message being broadcast throughout the monitoring network of FIG. 3 in which crosslinks are utilised.

FIG. 11 illustrates an event message being broadcast throughout the monitoring network of FIG. 3 in which in addition to routing the event message within the branches, the crosslinks are utilised to route the event messages in between branches. The crosslinks are used in their default configuration, in which the branch units they connect are configured as illustrated in FIG. 7. The manner in which each branch unit routes the event message depends on how it received the event message. Specifically:

1. if the branch unit receives an event message directly from an analytic module, then that branch unit routes the event message upstream, downstream, and through all its crosslinks. It also routes the event message to all its local subsystems. It does not route the event message back to the analytic module it received the event message from.
2. if the branch unit receives an event message from a crosslink, then that branch unit routes the event message upstream, downstream, and through its other crosslink if it has one. It also routes the event message to all its local subsystems. It does not route the event message back to the crosslink it received the event message from.
3. if the branch unit receives an event message from the unit above it in its branch, then that branch unit routes the event message upstream (if it has ports to other units than the one it received the event message from), and downstream. It also routes the event message to all its local subsystems. It does not route the event message on its crosslink(s). It does not route the event message back to the unit it received the event message from.
4. if the branch unit receives an event message from the unit below it in its branch, then that branch unit routes the event message downstream (if there are other units than the one it received the event message from), and upstream. It also routes the event message to all its local subsystems. It does not route the event message on its crosslink(s). It does not route the event message back to the unit it received the event message from.

In the example of FIG. 11, as with FIG. 10, the event message is generated by analytic module 325a in local subsystem 315 of branch unit 308. Following the above rules, analytic module 325a sends the event message to branch unit 308. Branch unit 308 receives the event message from analytic module 325a and thus follows rule 1 above. Branch unit 308 routes the event message upstream to analytic module 325b, to its other local subsystem 314, downstream to branch unit 305, and also over crosslink 323 to branch unit 309. Branch unit 308 does not send the event message back to analytic module 325a that generated the event message. Branch units 305 and 302 route the event message as described with reference to FIG. 10. Branch unit 309 receives the event message on crosslink 323, and thus follows rule 2 above. Branch unit 309 routes the event message upstream to local subsystem 326, downstream to branch unit 306, and on its other crosslink 324 to branch unit 310 in adjacent branch 3. Branch unit 310 receives the event message from crosslink 324 and thus follows rule 2 above. Branch unit 310 routes the event message to its local subsystems 1001 and 1002, and downstream to unit 307. Branch units 306, 303, 307 and 304 receive the event message from the unit above them in the branch, and thus follow rule 3 above. Thus, these branch units route the event message downstream and to their local subsystems (if they have them).

This method of utilising the crosslinks to transport event messages reduces the latency incurred when cross-triggering to those units physically close to the unit which generated the event message. FIG. 11 illustrates the number of cycles that it takes the event message to reach each of the units in the tree-based network, by a number in a circle next to each unit. It takes 3 cycles for the event message to reach the physically closest local subsystem 326 compared to 8 cycles using the method of FIG. 10. It takes 4 cycles for the event message to reach local subsystems 1001 and 1002 compared to 8 cycles using the method of FIG. 10. Thus, the method described with respect to FIG. 11 reduces the propagation delay of the event message between physically close subsystems. The longest propagation delay has also been reduced from 8 cycles to 6 cycles.

Figure 12:
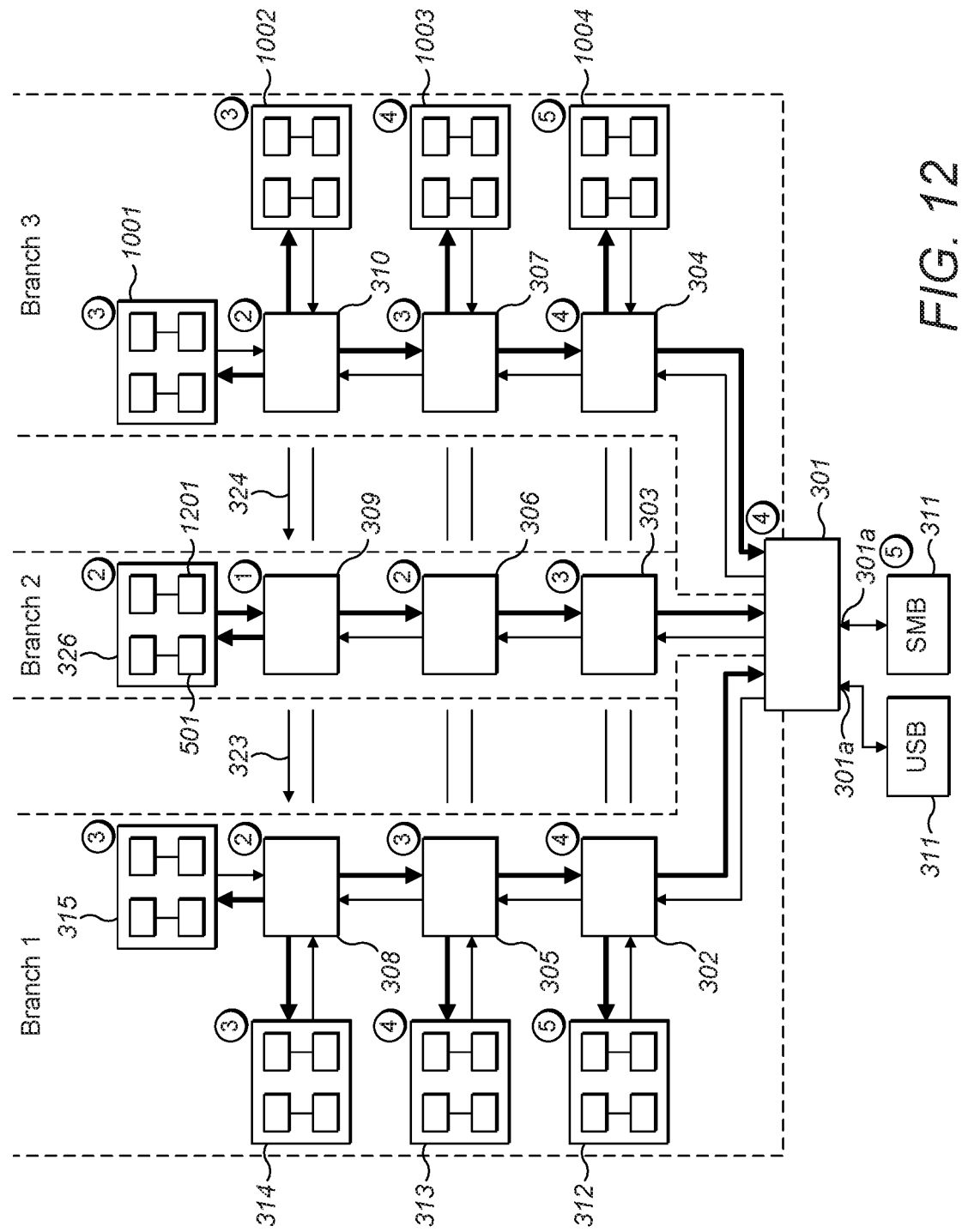
FIG. 12 illustrates another example of an event message being broadcast throughout the monitoring network of FIG. 3 in which crosslinks are utilised.

FIG. 12 illustrates another example in which an event message is broadcast throughout the monitoring network of FIG. 3 using the rules set out above. The event message is generated by analytic module 501 in local subsystem 326 of branch unit 309. Branch unit 309 receives the event message from analytic module 501 and thus follows rule 1 above. Branch unit 309 routes the event message upstream to analytic module 1201, downstream to branch unit 306, and also over its crosslink 323 to branch unit 308 and its crosslink 324 to branch unit 310. Branch unit 309 does not send the event message back to analytic module 501 that generated the event message. Branch units 308 and 310 receive the event message on a crosslink, and thus follow rule 2 above. Branch unit 308 routes the event message to its local subsystems 314 and 315, and downstream to branch unit 305. Branch unit 308 does not have another crosslink to route the event message onto. Branch unit 310 routes the event message to its local subsystems 1001 and 1002, and downstream to branch unit 307. Branch unit 310 does not have another crosslink to route the event message onto. Branch units 305, 306, 307, 302, 303 and 304 receive the event message from the unit above them in branch, thus follow rule 3 above. Thus, these branch units route the event message downstream and to their local subsystems (if they have them).

The event message may comprise an event code. The event code identifies the event which has been detected by the analytic module that generated the event message. Additionally, the event message may comprise a flag. For example, if a branch unit receives an event message directly from an analytic module (i.e. rule 1 above), it may set a flag to be transmitted with the event message downstream to the unit(s) below in the branch. It does not set the flag to be transmitted with the event message to units which are not below it in the branch. If a branch unit receives an event message from a unit above it in the branch with the flag set (i.e. rule 3 above), it: (i) routes the event message with the flag set to adjacent branch unit(s) below it in its branch, and (ii) routes the event message with the flag not set to adjacent unit(s) above it in the branch and its local subsystem.

The manner in which the root unit 301 responds to receiving an event message may depend on whether the flag is set. If the root unit 301 receives an event message for which the flag is set, it may respond by routing the event message to its lower ports 301a only. From there, the event message is sent to the communication interface(s) 311, 1005. The communication interface(s) may route the event message off-chip, for example to an off-chip analyser. Alternatively, the communication interface(s) may route the event message to another module on-chip, for example an on-chip analyser. If the root unit 301 receives an event message for which the flag is not set, it may take no action. In other words, the root unit 301 may not route the event message to any other units. This prevents an event message from being indefinitely broadcast around the system. As the flag is only set in the branch in which the event originated, the communication interface(s) only receive the event message from the root unit 301 once.

The flag may be a single bit of the event message. For example, the event code may be an 8 bit code, and the flag may be an additional single bit. For example, bits 0-7 may be the event code, and bit 8 may be the flag. Alternatively, the flag may form part of the event code.

If a crosslink has been enabled to route communications between branches in order to bypass a defective unit, then that crosslink is treated as an uplink or downlink for the purposes of event message propagation. Taking the defective system of FIG. 5 as an example, if an event is generated by analytic module 501 of local subsystem 326, then branch unit 309 forwards an event message downstream to branch unit 306, as well as through crosslinks 323 and 324 and back up to analytic module 1201 in local subsystem 326. Branch unit 306 has received the event message from upstream, thus operates according to rule 3. Since branch unit 306 treats crosslink 321 as a downlink to branch unit 305, branch unit 306 routes the event message downstream to branch unit 305 via crosslink 321. Branch unit 305 then routes the event message upstream to branch unit 308, downstream to branch unit 302 and to its local subsystem 313.

Taking the defective system of FIG. 6 as a further example, if an event is generated by analytic module 325a of local subsystem 315, then branch unit 308 forwards an event message downstream to branch unit 305, through crosslink 323, to local subsystem 314, and to analytic module 325b in local subsystem 315. Branch unit 305 has received the event message from upstream, thus operates according to rule 3. Since branch unit 305 treats crosslink 321 as a downlink to branch unit 306, branch unit 305 routes the event message downstream to branch unit 306 via crosslink 321. Branch unit 306 then routes the event message upstream to branch unit 309 and downstream to branch unit 303.

Since the enabled crosslink which is being used to bypass a defective unit is being treated as an uplink/downlink, the branch units attached to that crosslink maintain the flag as set when routing the event message downstream via the crosslink. Taking the example of FIG. 5, if an event is generated by analytic module 501 of local subsystem 326, branch unit 309 sets the flag of the event message when routing the event message downstream to branch unit 306. Branch unit 306 maintains the set flag when routing the event message downstream to branch unit 305 via crosslink 321. Branch unit 305 maintains the set flag when routing the event message downstream to branch unit 302. And branch unit 302 maintains the set flag when routing the event message downstream to root unit 301. Since the flag is set, root unit 301 routes the event message downstream to its connected communication interface(s) 311.

Each component of the SoCs illustrated in FIGS. 1 to 3, 5 to 8, and 10 to 12 may be implemented in dedicated hardware. Alternatively, each component of the SoC illustrated in FIGS. 1 to 3, 5 to 8, and 10 to 12 may be implemented in software. Some components may be implemented in software, whilst other components are implemented in dedicated hardware.

The SoC described is suitably incorporated within a computing-based device. The computing-based device may be an electronic device. Suitably, the computing-based device comprises one or more processors for processing computer executable instructions to control operation of the device in order to implement the methods described herein. The computer executable instructions can be provided using any computer-readable media such as a memory. The methods described herein may be performed by software in machine readable form on a tangible storage medium. Software can be provided at the computing-based device to implement the methods described herein.

The above description describes the system circuitry and monitoring circuitry as being comprised on the same SoC. In an alternative implementation, the system circuitry and monitoring circuitry are comprised across two or more integrated circuit chips of an MCM. In an MCM, the integrated circuit chips are typically stacked or located adjacently on an interposer substrate. Some system circuitry may be located on one integrated circuit chip and other system circuitry located on a different integrated circuit chip of the MCM. Similarly, the monitoring circuitry may be distributed across more than one integrated circuit chip of the MCM. Thus, the method and apparatus described above in the context of a SoC also apply in the context of an MCM.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A method of reconfiguring an addressing mechanism in a system-on-chip comprising system circuitry and monitoring circuitry configured to monitor the system circuitry, the monitoring circuitry comprising units connected in a tree-based structure configured to route communications through the system-on-chip, the tree-based structure comprising branches extending from a root unit, each branch comprising a plurality of units, each unit connected to a single unit above in the branch and a single unit below in the branch, whereby each unit routes communications to and from individually addressable entities above that unit in its branch, the tree-based structure further comprising cross-links connecting corresponding units of adjacent branches, the method comprising:
sending a discovery message;
receiving discovery responses from the units, each discovery response identifying a number of individually addressable entities in that unit and those units in the branch above that unit;
in response to not receiving a response from one or more units, determining that one of those units is defective;
enabling a crosslink between a first unit in a same branch as the defective unit and a second unit in an adjacent branch;
sending a further discovery message;
receiving a further discovery response from the second unit identifying a number of individually addressable entities in that second unit, those units in the branch above that second unit, the first unit, and those units in the branch above the first unit; and
reconfiguring an address of the crosslink so as to cause a subsequent communication to an individually addressable entity in the defective unit's branch to be routed via the adjacent branch and the crosslink, thereby bypassing the defective unit.

2. A method as claimed in claim 1, further comprising:
reconfiguring an address of each of the units of the adjacent branch between the second unit and the root unit so as to cause the subsequent communication to be routed via the second unit.

3. A method as claimed in claim 1, further comprising:
reconfiguring the root unit so as to prevent communications being sent directly to the same branch as the defective unit for those communications which are for an individually addressable entity of a destination unit, where the defective unit is between the root unit and the destination unit.

4. A method as claimed in claim 1, further comprising:
reconfiguring the root unit to send communications to individually addressable entities in the defective unit's branch via the adjacent branch, for those communications which are for an individually addressable entity of a destination unit, where the defective unit is between the root unit and the destination unit.

5. A method as claimed in claim 1, wherein each unit operates according to an addressing protocol in which each unit has a same internal address as other units in the tree-based structure that is a base address, and in which each unit is configured to address the other units using addresses which are derivable relative to that unit's internal address given positions of the other units in the tree-based structure.

6. A method as claimed in claim 5, wherein for each message sent from the root unit comprising a destination address of an individually addressable entity, that destination address is relative to an internal address of the root unit, the method comprising:
at a next intermediate unit adjacent to the root unit:
(i) receiving the message from the root unit;
(ii) rebasing the message by adding an offset to the destination address to form a rebased destination address, the rebased destination address being relative to an internal address of the intermediate unit; and
(iii) routing the rebased message onto the individually addressable entity.

7. A method as claimed in claim 1, wherein each individually addressable entity has an address index, and each unit has one or more address indices.

8. A method as claimed in claim 6, further comprising:
determining the offset to be −m, where m is a number of address indices allocated to the next intermediate unit and a local subsystem directly connected to the next intermediate unit.

9. A method as claimed in claim 7, wherein prior to determining that the unit is defective, each crosslink has 0 address indices.

10. A method as claimed in claim 9, wherein the reconfiguring of the address of the crosslink comprises allocating to that crosslink an address index.

11. A method as claimed in claim 10, wherein the crosslink is allocated address index of 1.

12. A method as claimed in claim 1, further comprising:
from the units that did not respond to the discovery message, determining a unit closest to the root unit in the branch to be the defective unit.

13. A method as claimed in claim 12, wherein the first unit is adjacent to the defective unit, the defective unit being between the first unit and the root unit in the branch.

14. A method as claimed in claim 13, further comprising:
in response to failing to enable the crosslink between the first unit and second unit, determining that the first unit is also defective;
enabling a further crosslink between a third unit in the same branch as the defective units and a fourth unit in an adjacent branch, the third unit being adjacent to the first unit, the first unit being between the third unit and the defective unit;
sending another discovery message;
receiving another discovery response from the fourth unit identifying a number of individually addressable entities in that fourth unit, those units in the branch above that fourth unit, the third unit, and those units in the branch above the third unit; and
reconfiguring an address of the further crosslink so as to cause a subsequent communication to an individually addressable entity in the defective units' branch to be routed via the adjacent branch and the further crosslink, thereby bypassing the defective units.

15. A method as claimed in claim 1, wherein each unit is connected to the unit above in the branch by a non-configurable link, and
wherein each unit is connected to the unit below in the branch by a non-configurable link.

16. A method as claimed in claim 1, wherein each crosslink is configurable.

\* \* \* \* \*